United States Patent
Lea

(10) Patent No.: US 10,069,986 B2
(45) Date of Patent: Sep. 4, 2018

(54) PRINTER INTERFACE SELECTION AND CONTROL

(71) Applicant: HEWLETT-PACKARD DEVELOPMENT COMPANY, L.P., Houston, TX (US)

(72) Inventor: Perry V. Lea, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/111,933

(22) PCT Filed: Jan. 27, 2014

(86) PCT No.: PCT/US2014/013199
§ 371 (c)(1),
(2) Date: Jul. 15, 2016

(87) PCT Pub. No.: WO2015/112179
PCT Pub. Date: Jul. 30, 2015

(65) Prior Publication Data
US 2016/0344880 A1 Nov. 24, 2016

(51) Int. Cl.
*H04N 1/00* (2006.01)
*G06F 3/038* (2013.01)
(Continued)

(52) U.S. Cl.
CPC ......... *H04N 1/00392* (2013.01); *G06F 3/038* (2013.01); *G06F 3/03545* (2013.01);
(Continued)

(58) Field of Classification Search
CPC ............ H04N 1/00392; H04N 1/00411; G06F 3/03545; G06F 3/038; G06F 3/041; G03G 15/5016
(Continued)

(56) References Cited

U.S. PATENT DOCUMENTS 4,686,332 A * 8/1987 Greanias ................. G06F 3/044
345/173
5,973,677 A * 10/1999 Gibbons ............... G06F 1/1626
178/18.04
(Continued)

FOREIGN PATENT DOCUMENTS

CN 201237815 5/2009
EP 0591083 10/1993
(Continued)

OTHER PUBLICATIONS

Matulic, F, Demo Abstract: SmartPublisher—Document Creation on Pen-Based Systems Via Document Element Reuse, (Research Paper), Oct. 10-13, 2013, 2 Pages.

*Primary Examiner* — Jamares Q Washington
(74) *Attorney, Agent, or Firm* — HP Inc. Patent Department

(57) ABSTRACT

A printer includes an interface selector to generate a signal that indicates whether a stylus has been installed with a printer. An interface controller monitors the signal from the interface selector to detect if the stylus has been installed with the printer and generates a first printer interface if the stylus has been detected and generates a second printer interface if the stylus has not been detected.

12 Claims, 6 Drawing Sheets

(51) Int. Cl.
*G06F 3/0354* (2013.01)
*G06F 3/0487* (2013.01)
*G03G 15/00* (2006.01)

(52) U.S. Cl.
CPC ....... *G06F 3/0487* (2013.01); *H04N 1/00411* (2013.01); *H04N 1/00509* (2013.01); *G03G 15/5016* (2013.01); *H04N 2201/0082* (2013.01); *H04N 2201/0094* (2013.01)

(58) Field of Classification Search
USPC ........ 358/1.15; 715/702, 701, 711; 345/179, 345/173
See application file for complete search history.

(56) References Cited

U.S. PATENT DOCUMENTS

| | | | |
|---|---|---|---|
| 6,114,958 A * | 9/2000 | Murphy | G06F 1/1616 200/61.59 |
| 6,924,791 B1 | 8/2005 | Nicolas | |
| 8,294,935 B2 | 10/2012 | Kil et al. | |
| 9,665,206 B1 * | 5/2017 | Missig | |
| 2002/0080401 A1 | 6/2002 | Abe | |
| 2004/0150803 A1 | 8/2004 | Boldon | |
| 2006/0250485 A1 | 11/2006 | Silverbrook | |
| 2007/0171436 A1 | 7/2007 | Manchester | |
| 2008/0036747 A1 | 2/2008 | Hope | |
| 2011/0075190 A1 | 3/2011 | Manico et al. | |
| 2012/0050807 A1 | 3/2012 | Noda et al. | |
| 2013/0107303 A1 * | 5/2013 | Uchida | G03G 15/5016 358/1.13 |
| 2013/0187855 A1 | 7/2013 | Radakovitz et al. | |
| 2013/0286033 A1 * | 10/2013 | Mesaros | G06F 3/03545 345/589 |
| 2014/0253467 A1 * | 9/2014 | Hicks | G06F 3/033 345/173 |
| 2014/0306909 A1 * | 10/2014 | Pedersen | G06F 3/03545 345/173 |

FOREIGN PATENT DOCUMENTS

| | | |
|---|---|---|
| EP | 1278116 | 5/2002 |
| EP | 1686449 | 8/2006 |
| WO | WO-2010147611 | 12/2010 |

\* cited by examiner

PRINTER INTERFACE SELECTION AND CONTROL

BACKGROUND

Printers can be classified by the printer technology they employ, with many such technologies being available as commercial products. The choice of print technology has a great effect on the cost of the printer and cost of operation, speed, quality and permanence of documents, and noise generated by the printing process itself. One feature of many modern printers is to provide a user interface with the printer to enable user input and control of a respective print job. In some cases, the interface can include inputs that enable the user to select various options both before and during printing of the job. The options allow the user to modify various aspects of the print job such as the number of printed copies, the type of media to employ in the print job, and in some cases, formatting of one or more pages of the print job, for example.

DETAILED DESCRIPTION

This disclosure relates to a printer that provides differing printer interface capabilities based on detected conditions associated with the printer. The detected conditions can include whether or not a stylus (e.g., pen-like device to operate a user interface for the printer) is available for the printing process. Based on detected stylus availability, for example, interface capabilities of the printer can be automatically adjusted. In some printing applications, a stylus may be included to enable detailed printing workflow applications such as quick editing of preview documents or digital signing of a document to be printed during the printing process, for example. In other applications, stylus functionality may not be required and thus an inexpensive plug can be installed in place of the stylus to reduce costs of the overall printing system. In one example, a stylus compartment can be associated with a printer (e.g., installed in the printer or cabled to printer) to house a stylus or a plug in the event a stylus is not utilized for a respective printing application.

An interface selector (e.g., electrical contact) in the stylus compartment generates a signal if the stylus has been removed from the stylus compartment. Thus, the removal of the stylus is an indicator that the stylus has been installed with the printer. Conversely, if the stylus or the plug remains installed in the stylus compartment, the signal remains in the opposite state indicating that the plug is installed and/or that the user intends not to use the stylus for a given print job. An interface controller monitors the signal from the interface selector to detect if the stylus has been removed from the stylus compartment and generates a stylus interface if the stylus has been removed. The interface controller generates a touch screen interface if the stylus or the plug is installed. The stylus interface can be a high-fidelity interface that can be tuned to the fine pointing and selection capabilities of the stylus. If the plug is installed (or the stylus remains installed), the touch screen interface can be tuned for multi-touch fidelity responsive to lower-fidelity tactile feedback. By adapting the interface to whether or not a stylus is installed, costs can be reduced in printing applications where stylus input is not required while automatically adapting interface capabilities for more detailed printing applications that employ a stylus.

Figure 1:
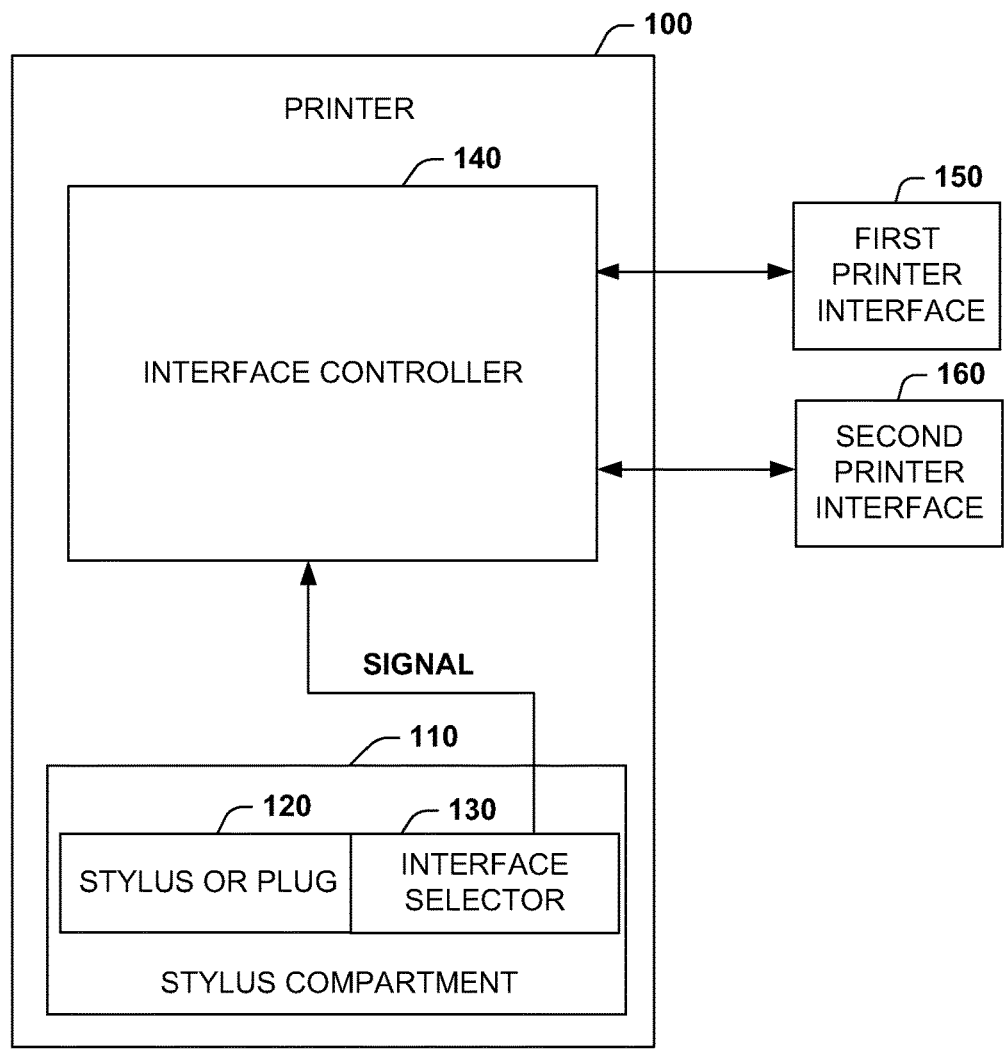
FIG. 1 illustrates an example printer that provides alternative interfaces based upon detected status of printer components.

FIG. 1 illustrates an example printer 100 that provides alternative interfaces based upon detected status of printer components. The printer 100 includes a stylus compartment 110 that houses a stylus at 120 if the stylus has been installed with the printer. If no stylus is installed with the printer 100, a plug can be placed at 120 of the stylus compartment 110. In some examples, the stylus compartment 110 can be integrated with (or within) the printer 100. In other examples, the stylus compartment 110 can be detached from the printer 110 and cabled to the printer. As used herein, the term stylus is a pen-like device employed to make detailed selections on an interface which can include generating digital signatures or other notations/selections. As shown, the printer 100 can include an interface selector 130 to generate a signal that indicates whether a stylus has been installed with the printer. For example, when the stylus is removed at 120 of the stylus compartment 110, the signal from the interface selector 130 can change state from a previous state indicating that the stylus is available for use.

An interface controller 140 monitors the signal from the interface selector 130 to detect if the stylus has been installed with the printer and generates a first printer interface 150 if the stylus has been detected (e.g., removed from stylus compartment at 120) and generates a second printer interface 160 if the stylus has not been detected (e.g., plug or stylus remaining installed at 120). In some examples, the interface controller 140 can be a dedicated microcontroller operating internal instructions. In other examples such as shown below with respect to FIG. 9, the interface controller can be provided as computer executable instructions that are executed by a processor, for example.

In one example, the first printer interface 150 can be a higher resolution interface more suitable for stylus operations, whereas the second printer interface 160 can be lower resolution interface more suitable for touch gestures via human tactile feedback, for example. As will be described below with respect to FIG. 4, a type of stylus can be detected with multiple differing interfaces selected based upon the stylus type detected. If a plug is installed at 120 (or stylus remains installed), the second interface 160 can be provided by the interface controller 140 and tuned for tactile feedback such as for touch gestures. If the stylus is removed at 120 of the stylus compartment 110, the interface selector 130 changes the signal state to indicate to the interface controller 140 to provide the first interface 150 having higher fidelity and more suitable for stylus operations (e.g., marking up a document, signing, adding notations, drawing shapes, and so forth).

As will be illustrated and described below with respect to FIG. 3, the interface selector 130 can include an electrical contact to generate the signal. For example, the electrical contact can be closed via a contactor (associated with the stylus or plug) when the stylus or the plug is installed. The electrical contact is opened when the stylus is removed and indicates the stylus is available for use. In an alternative example, the interface selector 130 can include a spring loaded contact to generate the signal. The spring loaded contact can be closed by pressure when the stylus or the plug is installed and opened when the stylus is removed at 120 of the stylus compartment 110, for example. In yet another example, the interface selector 130 can include multiple contacts, where each contact of the multiple contacts indicates a type of stylus when the stylus is removed. In yet another example, the interface selector 130 can include an electronic identifier (ID) to indicate a type of stylus when the stylus is removed.

As noted above, the first printer interface 150 can be a stylus interface to receive high-fidelity input supplied by a stylus tip, for example. The second printer interface 160 can be a touch screen interface to receive multi-touch input supplied by tactile feedback. In an alternative example, if a stylus is detected by the interface controller 140, the first printer interface 150 can be a hybrid interface that receives input supplied by a stylus tip and also can receive input supplied by tactile feedback. For example, some portions of the hybrid interface could be responsive to stylus inputs and other portions of the hybrid interface responsive to touch gestures. The first printer interface 150 or the second printer interface 160 can be a capacitive interface screen, a resistive interface screen, or an infrared interface screen, for example, to receive stylus and/or tactile feedback. If an interface screen (e.g., capacitive, resistive, infrared) is employed for the interface 150 or 160, the interface screen can be adjusted for high fidelity input if a stylus is detected or adjusted for multi-touch fidelity if a plug is detected, for example.

For purposes of simplification of explanation, in the present example, different components of the printer 100 are illustrated and described as performing different functions. However, the functions of the described components can be performed by different components, and the functionality of several components can be combined and executed on a single component. The components can be implemented, for example, as computer executable instructions (e.g., software, firmware), hardware (e.g., CPU, an application specific integrated circuit), or as a combination of both. In other examples, the components could be distributed among remote devices across a network, for example.

Figure 2:
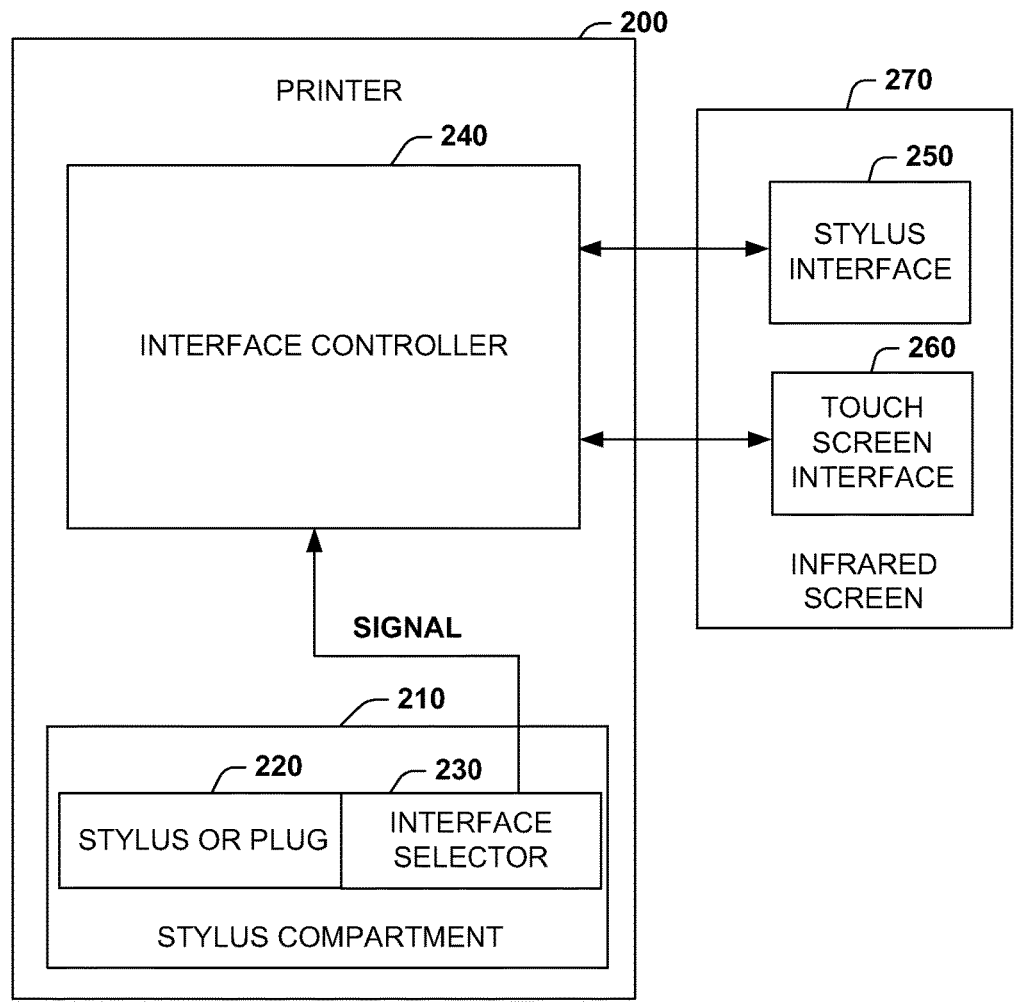
FIG. 2 illustrates an example printer that provides a stylus interface and a touch screen interface based upon detected status of printer components.

FIG. 2 illustrates an example printer 200 that provides a stylus interface and a touch screen interface based upon detected status of printer components. The printer 200 printer includes an associated stylus compartment 210 to house a stylus or a plug at 220. An interface selector 230 in the stylus compartment generates a signal if the stylus has been removed from the stylus compartment. An interface controller 240 monitors the signal from the interface selector 230 to detect if the stylus has been removed from the stylus compartment 210. The interface controller 240 generates a stylus interface 250 if the stylus has been removed and generates a touch screen interface if the stylus or the plug is installed at 220. As noted above, the stylus interface 250 can be a higher fidelity interface and more suitable for stylus operations such as drawing, signing, hand-written notations, detailed selections, and so forth. The touch screen interface 260 can be a lower fidelity interface more suitable for touch gestures via human tactile feedback. This may include providing larger selection objects (e.g., boxes, circles, icons, and so forth) on the interface that can be easily controlled and manipulated via touch gestures.

In one example, the interface controller 240 can be coupled to an infrared screen 270 having display and input capabilities. If a stylus is detected, the interface controller 240 can tune the infrared screen 270 for higher fidelity stylus operations for the stylus interface 250. If the plug is installed at 220 (or stylus remains installed), the interface controller 240 can tune the infrared screen 270 for lower fidelity touch gesture operations for the touch screen interface 260. As noted above, in some cases, a hybrid interface can be generated at the infrared screen 270 where both stylus and touch gestures can be concurrently supported.

Figure 3:
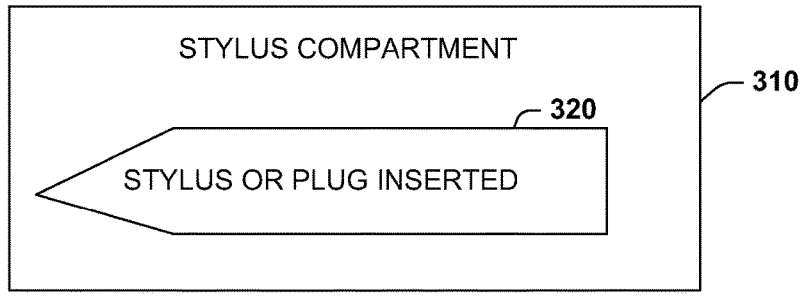
FIG. 3 illustrates a stylus compartment that includes an installed stylus or plug.

FIG. 3 illustrates a stylus compartment 310 that includes an installed stylus or plug at 320. Typically, if a stylus is installed at 320, the shape of the stylus will generally fit within an area (e.g., cavity) of the stylus compartment 310. In some examples, the stylus compartment 310 may be roughly the same shape as the stylus, for example. If a plug is inserted at 320, this may include a relatively inexpensive end cap that includes a contactor (not shown) to indicate that the plug is installed. In some examples, the plug could be the same shape as the stylus and in other examples the plug can be a different shape than the stylus.

Figure 4:
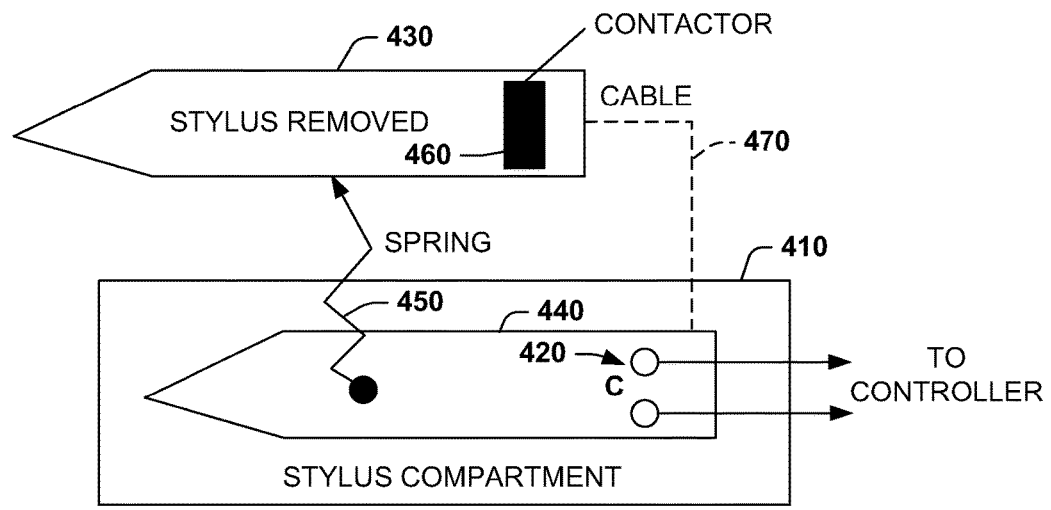
FIG. 4 illustrates a stylus compartment and interface selector where a stylus has been removed.

FIG. 4 illustrates a stylus compartment 410 and interface selector 420 where a stylus has been removed. A stylus 430 is shown as removed from a cavity 440 in the compartment 410. A spring 450 may be provided to assist in removal of the stylus 430 from the stylus compartment 410. As shown, the interface selector 420 includes a contact "C" that supplies a signal (or signals) to the controller (not shown). In some cases, one of the contacts of C may be tied to a voltage potential or ground in the stylus compartment 410 while the other contact of C may be supplied to the controller. The stylus (or plug) includes a contactor 460 (e.g., metallic conductor). Thus, when the stylus or the plug is installed in the stylus compartment 410, the contactor 460 closes the contact C of interface selector 420 by completing a path across the contact C. When the stylus 430 is removed, the contact C is opened. It is noted that the contactor 460 could encircle the stylus or plug. In other examples, the contactor 460 could be oriented horizontally (with respect to the length) or vertically (with respect to the width) of the stylus or plug. The contact C of the interface selector 420 can be positioned accordingly for contact with the contactor 460 depending on the orientation of the contactor when the stylus or plug is seated in the stylus compartment 410. As shown, a cable 470 can be supplied with the stylus 430 to keep it located within vicinity of the stylus compartment 410.

Figure 5:
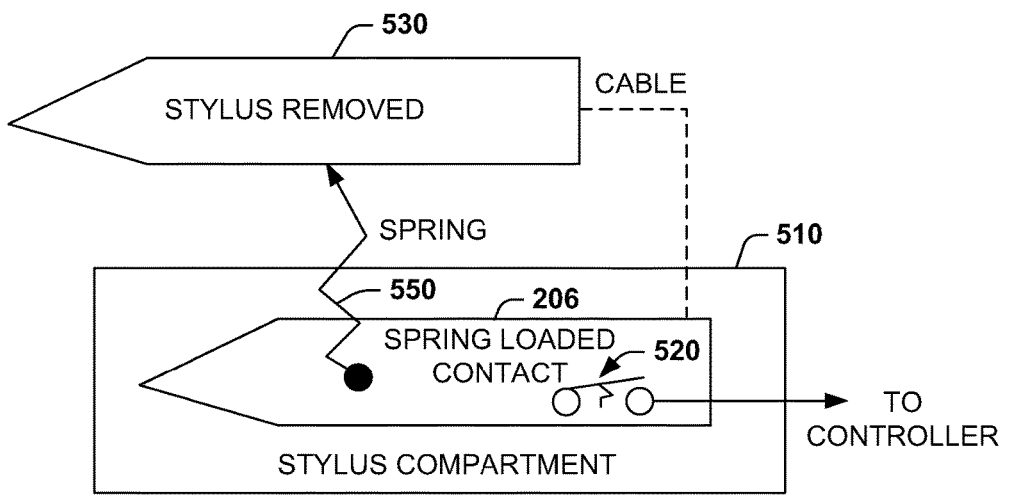
FIG. 5 illustrates a stylus compartment and alternative interface selector where a stylus has been removed.

FIG. 5 illustrates a stylus compartment 510 and alternative interface selector 520 where a stylus has been removed. In this example, a stylus 530 is shown as removed from a cavity 540 in the compartment 510. A spring 550 may be provided to assist in removal of the stylus 530 from the stylus compartment 510. As shown, the interface sector 520 includes a spring loaded contact that supplies a signal (or signals) to the controller (not shown). In some cases, one of the contacts of the spring loaded contact may be tied to a voltage potential or ground in the stylus compartment 510 while the other contact may be supplied to the controller. When the stylus or the plug is installed in the stylus compartment 510, the spring loaded contact of interface selector 520 closes by the pressure applied to the contact. When the stylus 530 is removed, the spring loaded contact of interface selector 520 is opened. As shown, a cable 570 can be supplied with the stylus 530 to keep it located within vicinity of the stylus compartment 510.

Figure 6:
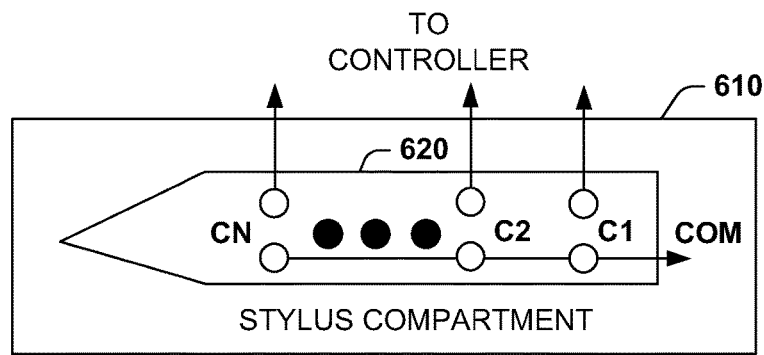
FIG. 6 illustrates a stylus compartment where multiple contacts are employed as an interface selector.

FIG. 6 illustrates a stylus compartment 610 where multiple contacts are employed as an interface selector. The multiple contacts are shown as C1, C2, though CN in stylus cavity 620, with N being a positive integer. Each of the respective contacts can indicate a different type of stylus. For example, the stylus that may be installed in the cavity 620 may have different contactor locations depending on the type of stylus employed. For instance, a first stylus may employ a contactor that closes C1 when the stylus is installed and a second type of stylus closes C2 when the stylus is installed. The interface controller described above can monitor each of the contacts C1 through CN. If at least one of the contacts is closed, the controller notes that location and assumes a plug or a stylus of a given type is installed. While installed, the controller can provide the touch screen interface, for example, as described above. When the stylus is removed however, the controller can generate an interface that is adapted to the stylus type (e.g., very fine, medium, coarse, shape, color, and so forth) that was associated with the contact that was closed when the stylus was installed. Thus, if contact C2 were closed before removal, an interface adapted to stylus type 2 can be generated. If contact C1 were closed before removal, an interface adapted to stylus type 1 can be generated after removal, and so forth.

Figure 7:
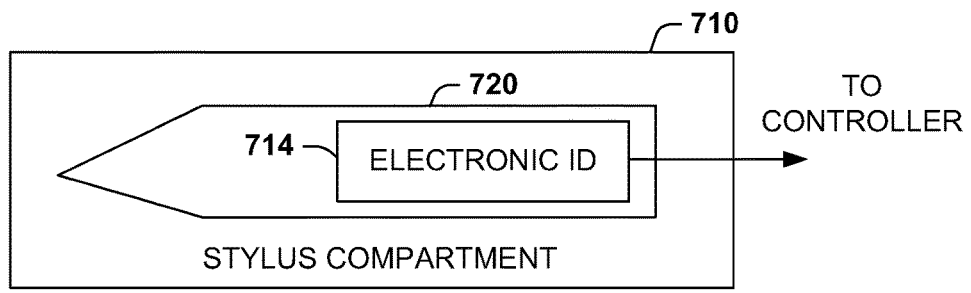
FIG. 7 illustrates a stylus compartment where an electronic ID is employed as an interface selector.

FIG. 7 illustrates a stylus compartment 710 where an electronic ID 714 is employed as an interface selector. In this example, when a stylus (not shown) is removed from a cavity 720 in the stylus compartment 710, the electronic ID 714 can be activated to indicate a stylus type to the controller. This can include the generation of different electronic codes to indicate the stylus type. Thus, if a first code were generated by the electronic ID 714, a first interface could be generated by the controller. If a second code were generated, a second interface could be generated by the controller, and so forth. The electronic ID could take several forms such as an RF ID tag or a register code that is activated when the stylus is removed, for example. Activation could be based on light sensitivity (e.g., photodiode detector), where when light entered the cavity 720 when the stylus was removed, the electronic ID 714 could be generated. In yet another example, the stylus itself could contain a code (e.g., bar code) indicating the type and the electronic ID 714 could be generated from a code reader installed in the cavity 720.

Figure 8:
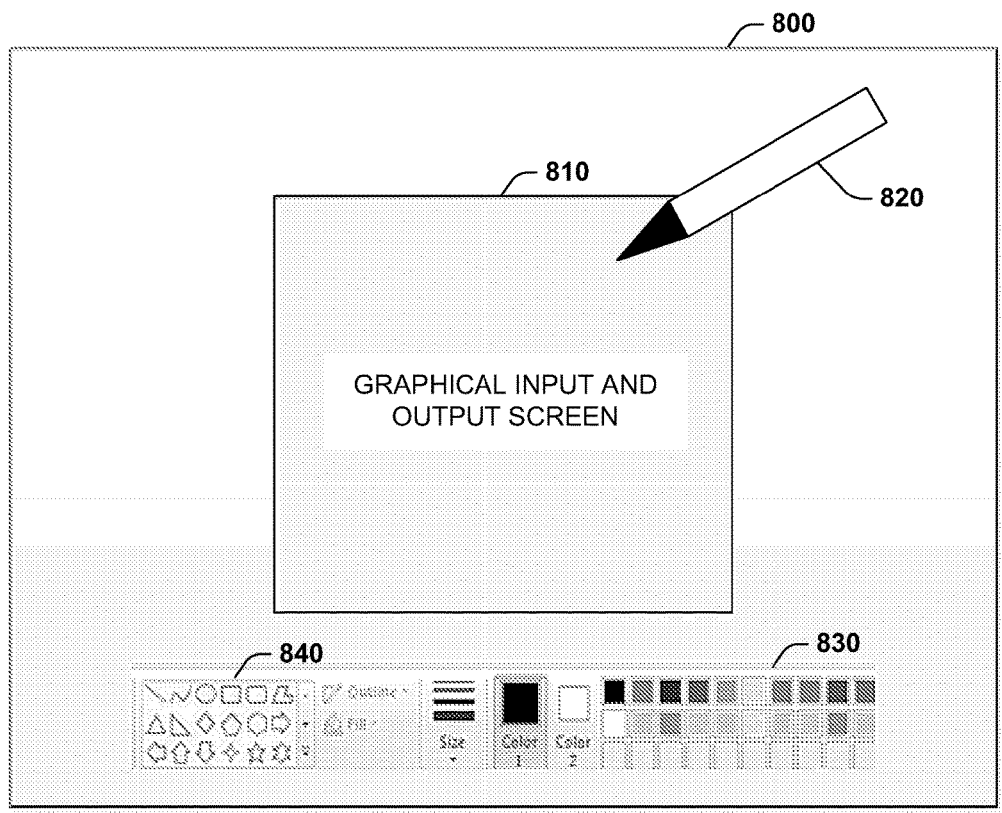
FIG. 8 illustrates an example stylus interface that can be employed with a printer.

FIG. 8 illustrates an example stylus interface 800 that can be employed with a printer. The interface 800 can include a graphical input and output screen 810 (also referred to as screen 810) where interface output can be directed and interface input can be provided via a stylus 820. For example, if a print job were interrupted to provide a digital signature on one or more of the pages of the print job, the stylus 820 can be employed to enable the user to enter the signature which is then copied by the interface controller (described above) and automatically embedded within the respective print job.

The stylus 820 can be employed to provide substantially any type of notation on the screen 810 which can in turn be transferred to one or more pages of the print job. Another feature of the interface 800 is to provide the user with input controls 830 which enable the user to control various aspects of the stylus operations when inputting to the screen 810.

For example, the input controls 830 selectable by the stylus 820 and can include color selections for stylus lines and line size selections to control the width of lines applied by the stylus. This can include providing shape options 840 which enable the user to draw various shapes such as circles, squares, rectangles, arrows, stars, and so forth which can be drawn by the stylus 820 and subsequently embedded into the print job by the interface controller. As noted previously, the interface 800 including the screen 810 and input controls 830 can be generated on a capacitive type or infrared type I/O screen, for example.

Figure 9:
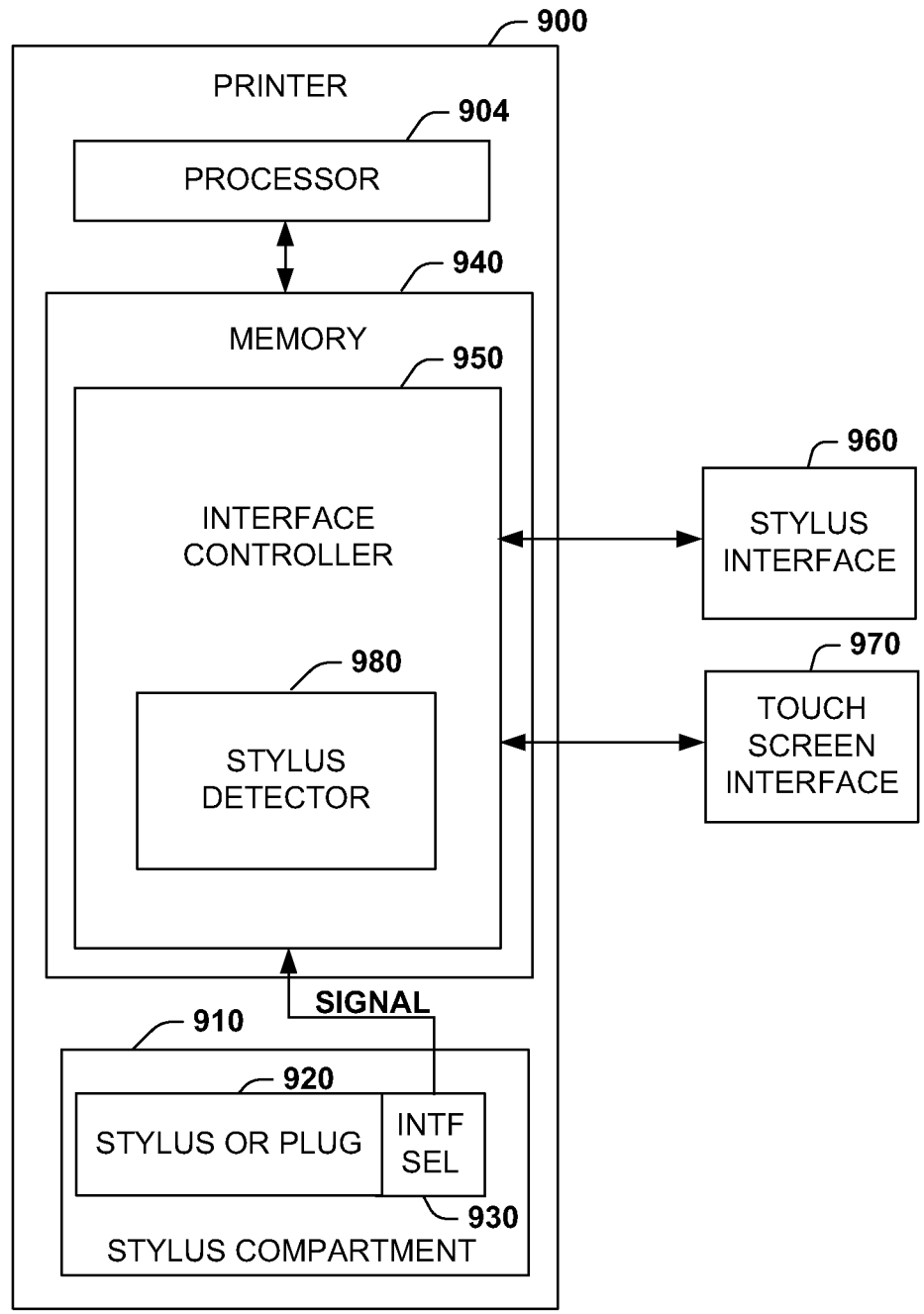
FIG. 9 illustrates an example printer and processor that provide alternative interfaces based upon detected status of printer components.

FIG. 9 illustrates an example printer 900 and processor 904 that provide alternative interfaces based upon detected status of printer components. The printer 900 includes a stylus compartment 910 associated with the printer to house a stylus or a plug at 920. An interface selector 930 in the stylus compartment 910 generates a signal if the stylus has been removed from the stylus compartment at 920. The processor 904 operates the printer and interfaces with a memory 940 having computer executable instructions to be executed by the processor. The computer executable instructions in the memory 940 include an interface controller 950 to generate a stylus interface 960 if the stylus has been removed from the stylus compartment 910. The interface controller 950 generates a touch screen interface 970 if the stylus or the plug is installed in the stylus compartment 910. A stylus detector 980 in the interface controller 950 detects if the stylus has been removed from the stylus compartment 910 based on the signal from the interface selector. Upon detection, the detector 980 can interrupt the interface controller 980 from other printing operations to indicate that the stylus has been detected.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A printer, comprising:
    an interface selector to generate a signal, the signal indicating whether a stylus has been installed with a printer or the stylus has not been installed, wherein the interface selector includes multiple contacts, wherein each contact of the multiple contacts indicates a type of stylus when the stylus is removed; and
    an interface controller to monitor the signal from the interface selector to detect if the stylus has been installed with the printer and to display a first printer interface if the stylus has been detected and to display a second printer interface if no stylus has been detected, wherein the first printer interface is a stylus interface and the second printer interface is a touch screen interface, the stylus interface being a higher fidelity interface than the touch screen interface.

2. The printer of claim 1, further comprising a stylus compartment that houses the stylus if the stylus has been installed with the printer or houses a plug if the stylus has not been installed with the printer, wherein the interface selector is operatively coupled to the stylus compartment to generate the signal.

3. The printer of claim 2, wherein the interface selector includes an electrical contact to generate the signal, wherein the electrical contact is closed via a contactor when the stylus or the plug is installed and the electrical contact is opened when the stylus is removed.

4. The printer of claim 2, wherein interface selector includes a spring loaded contact to generate the signal, wherein the spring loaded contact is closed by pressure when the stylus or the plug is installed and is opened when the stylus is removed.

5. The printer of claim 2, wherein the interface selector includes an electronic identifier (ID) to indicate a type of stylus when the stylus is removed.

6. The printer of claim 1, wherein the first printer interface is a hybrid interface that, receives input supplied by a stylus tip and input supplied by tactile feedback.

7. The printer of claim 1, wherein the first printer interface or the second printer interface is a capacitive interface screen, a resistive interface screen, or an infrared interface screen.

8. The printer of claim 7, wherein the capacitive interface screen, the resistive interface screen, or the infrared interface screen is adjusted for high fidelity input if a stylus is detected or adjusted for multi-touch fidelity if a plug is detected.

9. A printer, comprising:
a stylus compartment associated with a printer to house a stylus or a plug;
an interface selector in the stylus compartment to generate a signal, the signal indicating either (a) that the stylus is installed and has been removed from the stylus compartment or (b) that the plug is installed, wherein the interface selector includes multiple contacts, wherein each contact of the multiple contacts indicates a type of stylus when the stylus is removed; and
an interface controller to monitor the signal from the interface selector to detect if the stylus has been removed from the stylus compartment and to display a stylus interface if the stylus has been removed and to display a touch screen interface if the stylus or the plug is installed,
wherein the stylus interface is a higher fidelity interface than the touch screen interface.

10. The printer of claim 9, wherein the interface selector includes an electrical contact to generate the signal, wherein the electrical contact is closed via a contactor when the stylus or the plug is installed and the electrical contact is opened when the stylus is removed.

11. The printer of claim 9, further comprising an interface screen that is adjusted by the interface controller for high fidelity input if a stylus is detected or adjusted for multi-touch fidelity if a plug is detected.

12. A printer, comprising:
a stylus compartment associated with a printer to house a stylus or a plug;
an interface selector in the stylus compartment to generate a signal, the signal indicating either (a) that the stylus is installed and has been removed from the stylus compartment or (b) that the plug is installed, wherein the interface selector includes multiple contacts, wherein each contact of the multiple contacts indicates a type of stylus when the stylus is removed;
a processor to operate the printer;
a memory having computer executable instructions to be executed by the processor, the computer executable instructions to:
display a stylus interface if the stylus has been removed from the stylus compartment and to display a touch screen interface if the stylus or the plug is installed in the stylus compartment, wherein the stylus interface is a higher fidelity interface than the touch screen interface; and
detect if the stylus has been removed from the stylus compartment based on the signal from the interface selector.

* * * * *

UNITED STATES PATENT AND TRADEMARK OFFICE
CERTIFICATE OF CORRECTION

| | | |
|---|---|---|
| PATENT NO. | : 10,069,986 B2 | Page 1 of 1 |
| APPLICATION NO. | : 15/111933 | |
| DATED | : September 4, 2018 | |
| INVENTOR(S) | : Perry V. Lea | |

It is certified that error appears in the above-identified patent and that said Letters Patent is hereby corrected as shown below:

In the Claims

In Column 7, Line 18 (approx.), in Claim 6, delete "that," and insert -- that --, therefor.

Signed and Sealed this
Third Day of December, 2019

Andrei Iancu
*Director of the United States Patent and Trademark Office*